United States Patent [19]

Kakinuma

[11] Patent Number: 5,728,250
[45] Date of Patent: Mar. 17, 1998

[54] METHOD AND APPARATUS FOR MANUFACTURING BONDED DISKS

[75] Inventor: Keiji Kakinuma, Shizuoka, Japan

[73] Assignee: Toshiba-EMI Limited, Tokyo, Japan

[21] Appl. No.: 623,520

[22] Filed: Mar. 29, 1996

[30] Foreign Application Priority Data

Mar. 31, 1995 [JP] Japan .................. 7-076080

[51] Int. Cl.$^6$ .................. B32B 31/00
[52] U.S. Cl. .................. 156/275.7; 40/340; 156/315; 369/275.5; 369/286; 428/65.2
[58] Field of Search .................. 156/272.7, 315; 428/65.2; 40/340; 369/275.5, 286

[56] References Cited

U.S. PATENT DOCUMENTS 5,197,060  3/1993  Yatake .................. 369/275.5

FOREIGN PATENT DOCUMENTS

| 443797 | 8/1991 | European Pat. Off. . |
| 566032 | 10/1993 | European Pat. Off. . |
| 4235178 | 5/1993 | Germany . |
| 4302384A | 7/1993 | Germany . |
| 9418355 | 3/1995 | Germany . |

OTHER PUBLICATIONS

Patent (Abstract) of Japan, vol. 12, No. 86 & JPA 62 219250 Mar. 18, 1988–Masuda Toshiyuki "Air Sandwich Type Information Recording Meduim".

Patent (Abstact) of Japan, vol. 15, No. 20 & JPA 02 263343, Jan. 17, 1991–Koyahara Satoru "Information Recording Medium".

Patent (Abstact) of Japan, vol. 15, No. 20 & JPA 02 263342, Jan. 17, 1991–Koyahara Satoru "Information Recording Medium".

Patent (Abstract) of Japan, vol. 13, No. 506 & JPA 01 204727, Nov. 14, 1989–Shizuki Masao, "Manufacture of Optical Disk for Information Recording".

*Primary Examiner*—John J. Gallagher
*Attorney, Agent, or Firm*—Lowe, Price, LeBlanc & Becker

[57] ABSTRACT

The method and apparatus of making a bonded disk according to this invention is intended to produce bonded disks in a large number at low cost, wherein a bonding strength is not reduced when the inner bonding surface is recessed for title display, it is not deformed easily when stored or left at a high temperature for a long period of time, at least one disk of the paired one-sided disks is formed with a recess for title display where is connected to the stamper clamp groove, a title consisting of desired letters and patterns is printed with an ink on the recess of the one-sided disk, the bonding surface of at least one disk of the paired one-sided disks is applied with a thermoplastic bonding agent while a liquid type reaction setting bonding agent is applied to the recess and the stamper clamp groove of the one-sided disk, and the paired one-sided disks are stacked to bring their bonding surfaces in contact with each other and press them together to form a single bonded disk.

6 Claims, 6 Drawing Sheets

METHOD AND APPARATUS FOR MANUFACTURING BONDED DISKS

BACKGROUND OF THE INVENTION

1. Field of the Invention

The present invention relates to a method and an apparatus for manufacturing a bonded disk, such as a laser disk and a bonded type digital video disk (DVD), by bonding two one-sided disks together.

2. Description of the Prior Art

Some optical disks, whose recorded information is read by using laser beams, are made by bonding together two disk substrates, one of which offers the first side of the finished disk and the other the second side. Examples include laser disks and DVDs. A laser disk is taken for example in describing the method of manufacturing such optical disks.

First, a die (called a stamper) formed beforehand with pits representing recording information is mounted in a resin molding machine such as an injection molding machine. A transparent plastic resin such as a polycarbonate or acrylic resin is injection-molded or pressure-molded by the stamper to form a transparent plastic disk (one-sided disk) that is stamped with pits (substrate forming process). Following this, the surface of the disk formed with pits is deposited with a metal such as aluminum by sputtering or vacuum vapor deposition to form a reflection film (reflection film forming process). Then, the surface of the reflection film is coated with an ultraviolet-setting resin using a spinner or the like, and is irradiated with ultraviolet radiation (light) to form a protective film for protection against scores and corrosion (protective film coating process).

A pair of one-sided disks, which will form the A side and B side of a finished disk, are produced separately in this way. The surfaces of the one-sided disks which are to be bonded together, are applied with a thermoplastic bonding agent referred to as a hot melt using a roll coater or the like (bonding agent coating process). Then, the paired one-sided disks are stacked together so that the surfaces which are applied with the bonding agent contact each other, and then pressed together to form a single laser disk (bonding process).

In recent years, small digital video disks (DVDs) 12 cm in diameter capable of high-density, double-sided recording have been under development. In such small disks, a large part of the flat disk surface ranging from the center hole of the disk to the recording region is used as a clamp zone of the player. Hence, when the disk is placed on the turntable of the player and held by a clamper, the flat clamp zone works as a reference surface for the optical system. Further, in such a small, double-sided recording disk, there is no alternative but to use the flat clamp zone as a title display area of the disk.

When a title is printed, or a seal is "stuck" (viz., adhered in place), on the outer surface of the clamp zone of a small disk such as DVD, however, the following problem arises.

In a small, double-sided, recording disk such as DVD, the allowable range of disk tilt angle for reproduction is significantly small compared with that of the laser disk, so that even a slight tilt can degrade the reproduced signal substantially. When the clamp zone is used as the title display area, surface undulations caused by a seal or printed ink applied to the outer surface of the clamp zone result in an increased tilt of the disk.

Figure 7A:
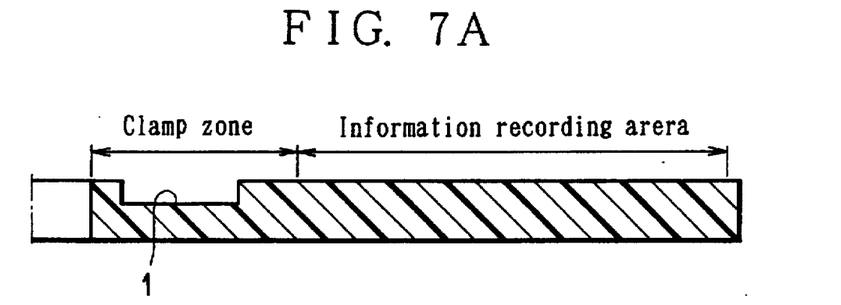
FIG. 7A to 7C are schematic cross sections showing a problem encountered during the process of forming a title display on the inner bonding surface.

To avoid this problem it is necessary that the title to be printed, or the seal to be stuck, on the inner bonding side of the disk, rather than on the outer side. When the title is displayed on the inner bonding surface, it is necessary to ensure that the printed ink and the seal do not affect the overall thickness of the bonded disk. For this purpose, some steps should be taken, such as cutting the title display area to a depth equal to the thickness of the printed ink or stuck seal (for example, 0.1 mm) to form a recess 1 as shown in FIG. 7A.

Figure 7B:
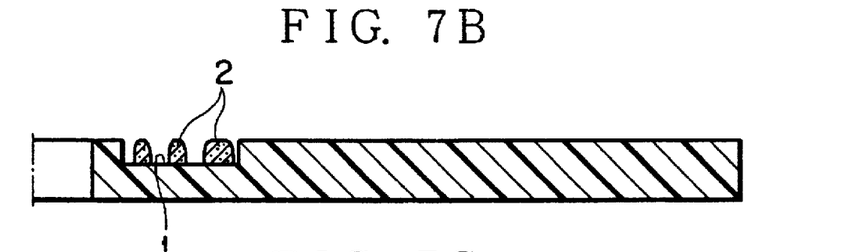
Figure 7C:
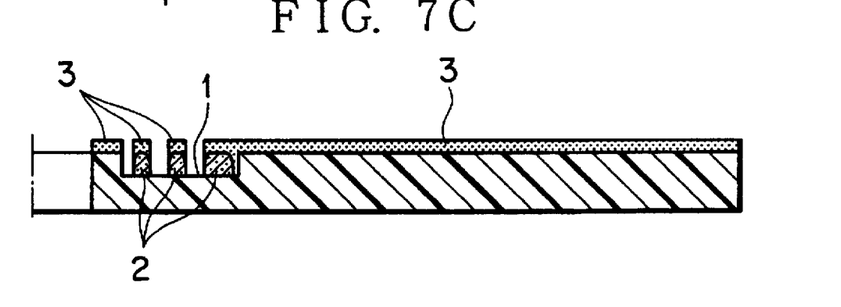
Figure 8:
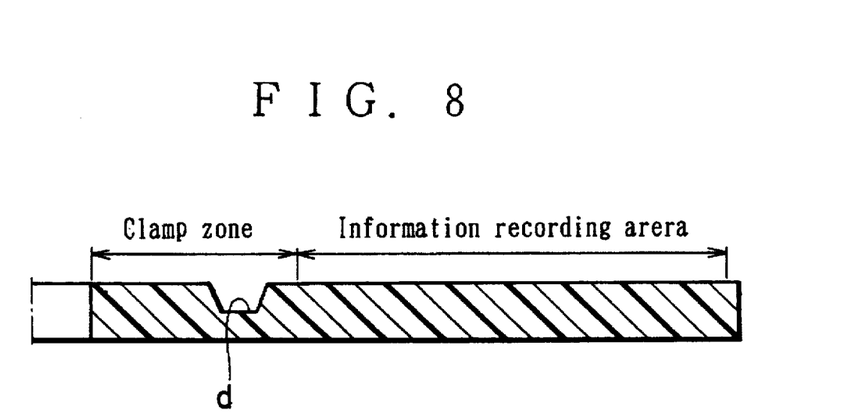
FIG. 8 is an enlarged schematic cross section of a one-sided disk for DVD.

However, even this measure cannot solve the above problem because the thickness of the printed ink and seal may not always be constant. Particularly when letters are printed with ink, the ink 2 forms into bulges or projections, as shown in FIG. 7B. If a hot melt as the bonding agent is applied over these projections by the roll coater, the entire recess 1 in the title display area cannot be filled with the bonding agent, with the hot melt 3 coated only over the projections of the ink 2, as shown in FIG. 7C. Therefore, the area of the recess 1 is bonded only partially and therefore with a reduced bonding force.

In the case of the laser disk, the paired disk substrates to be bonded together are each 1.2 mm thick and have high rigidity (mechanical strength) so that the aforementioned deformation will not result. In the case of the DVD, however, each of the paired disk substrates measures 0.6 mm in thickness and does not have sufficient rigidity. Hence, when a thin disk such as DVD is stored or left at elevated temperatures for a long period, it is likely to develop deformations. Particularly when a disk is left mounted on the reproduction player for a long period, the disk held horizontal by the clamper is subjected to high temperatures due to internal heating of the player, so that the hot melt, the thermoplastic bonding agent, becomes soft allowing the disk outer periphery to droop under its own weight, making the whole disk look like a bowl turned upside down.

Further, the actual plastic disk (one-sided disk) formed during the substrate forming process has a ring groove d (hereinafter called a stamper clamp groove) for receiving the stamper clamp that fixes the stamper to the resin molding machine. The part of the disk where there is the stamper clamp groove has a smaller thickness than other areas and therefore a smaller strength. The reduced strength due to the stamper clamp groove d, combined with the recess 1 formed on the bonding inner surfaces of the one-sided disks, makes the bonded disk more likely to be deformed.

The present invention solves the above problem and its major objective is to provide a method and an apparatus for manufacturing a bonded disk, which can be mass-produced inexpensively, which prevents the bonding strength from being reduced even when the bonding inner surfaces are formed with a recess for title display, and which is not easily deformed even when it is stored or left at elevated temperatures for a long period.

SUMMARY OF THE INVENTION

To achieve the above objective, the present invention offers a method of making a bonded disk, which comprises the steps of: preparing a one-sided disk which has a recess for title display connecting to a stamper clamp groove as at least one disk of paired one-sided disks to be bonded together; applying a thermoplastic bonding agent to a bonding surface of at least one disk of the paired one-sided disks to be bonded together after displaying a title having desired characters and patterns on the recess of the one-sided disk; applying a liquid type reaction setting bonding agent to the stamper clamp groove and the recess of the one-sided disk; stacking the paired one-sided disks so that the surfaces applied with the thermoplastic bonding agent and the reaction setting bonding agent are in contact with each other; and pressing the paired one-sided disks together to form a bonded disk.

It is desired that the pressing be performed in a vacuum. Further, it is also preferred that the title display on the recess be provided by printing or by sticking a seal.

When the liquid type reaction setting bonding agent is an ultraviolet-setting bonding agent, the pressing is preferably done while irradiating the ultraviolet-setting bonding agent with ultraviolet radiation. When the liquid type reaction setting bonding agent is a cationic polymerized, ultraviolet-setting bonding agent, the pressing is carried out after irradiating the cationic polymerized, ultraviolet-setting bonding agent.

Further, to achieve the above objective, this invention offers an apparatus for making a bonded disk, which comprises: a title display means for displaying a title having desired characters and patterns on a recess for title display communicating with a stamper clamp groove of at least one of paired one-sided disks to be bonded together; a first bonding agent application means for applying a thermoplastic bonding agent to a bonding surface of at least one of the paired one-sided disks to be bonded together; a second bonding agent application means for applying a liquid type reaction setting bonding agent to the stamper clamp groove and the recess of the one-sided disk; and a disk bonding means for stacking the paired one-sided disks so that the surfaces applied with the thermoplastic bonding agent and the reaction setting bonding agent, contact each other and are then pressed together.

It is desired that the apparatus have a vacuum creating means which encloses the disk bonding means and creates a vacuum therein. It is also preferable that the title display means be a printing device or a seal sticking device.

Further, when the liquid type reaction setting bonding agent is an ultraviolet-setting bonding agent, the disk bonding means should preferably have an ultraviolet irradiating mechanism. When the liquid reaction setting bonding agent is a cationic polymerized, ultraviolet-setting bonding agent, the second bonding agent application means should preferably have an ultraviolet irradiating mechanism.

Figure 1A:
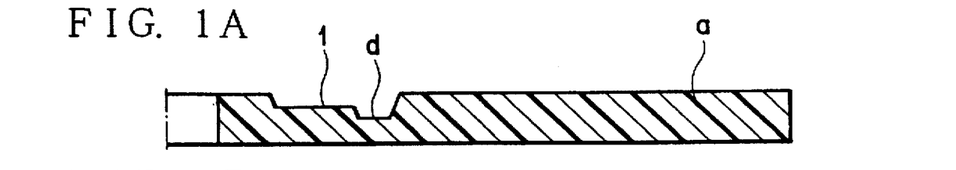
FIG. 1A to 1F are schematic cross sections showing the process of making a bonded disk according to this invention.

In this invention, at least one of the paired one-sided disks to be bonded together uses the one-sided disk a which is formed in the clamp zone with a recess 1 for title display that has specified depth and width (in the case of DVD, 0.1 mm in depth and 5 mm in width) and communicates with a stamper clamp groove d, as shown in FIG. 1A.

Figure 1B:
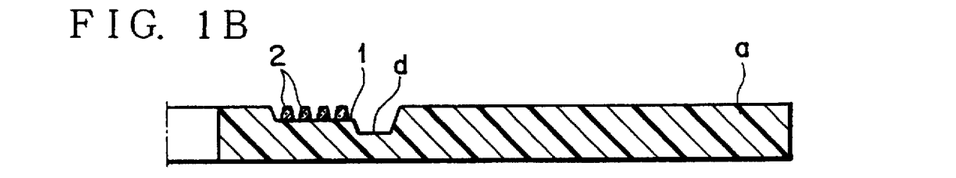
Figure 1C:
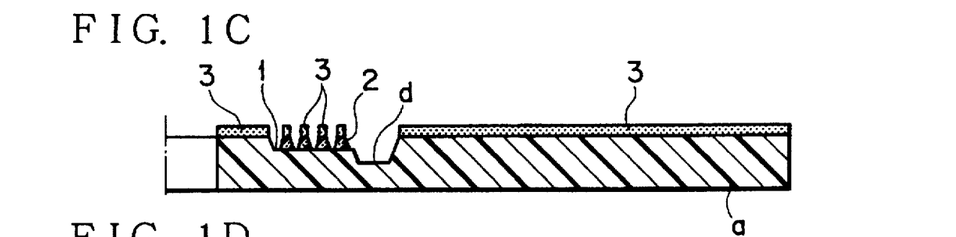

On the recess 1 of the one-sided disk a, a title having desired characters and patterns is printed with ink 2, as shown in FIG. 1B, or a seal showing the title is pasted. Next, as shown in FIG. 1C, at least one of the paired one-sided disks to be bonded together, for example, the one-sided disk a, is applied with a thermoplastic bonding agent 3 over its bonding surface.

Figure 1D:
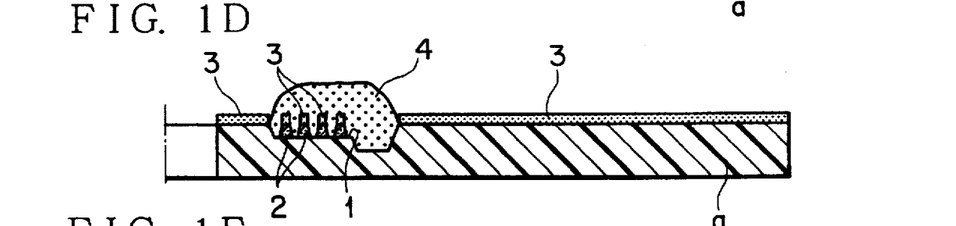

Next, as shown in FIG. 1D, a liquid type reaction setting bonding agent 4, such as ultraviolet-setting bonding agent or cationic polymerized, ultraviolet-setting bonding agent, is applied to the recess 1 and the stamper clamp groove d of the one-sided disk a. After this, the paired one-sided disks a, b are stacked together so that their bonding surfaces coated with the thermoplastic bonding agent 3 and the reaction setting bonding agent 4 contact each other, and then pressed together, as shown in FIG. 1E or 1F.

Because the disk bonded in this manner has the title displayed on the bonding inner surface, there are no undulations on the surface of the clamper zone, reducing the tilt angle of the disk, contributing to improved reproduction.

Further, the paired one-sided disks are bonded together with the stamper clamp groove d and the title display recess 1 filled with the reaction setting bonding agent 4. Because the filling bonding agent has the ability to harden, it does not soften even when subjected to heat once the bonding has been completed. This prevents the strength of the stamper clamp groove d and the recess 1 from deteriorating due to heat, which in turn minimizes deformations of the stamper clamp groove d and the recess 1 and therefore the deformation of the entire disk.

Figure 1E:
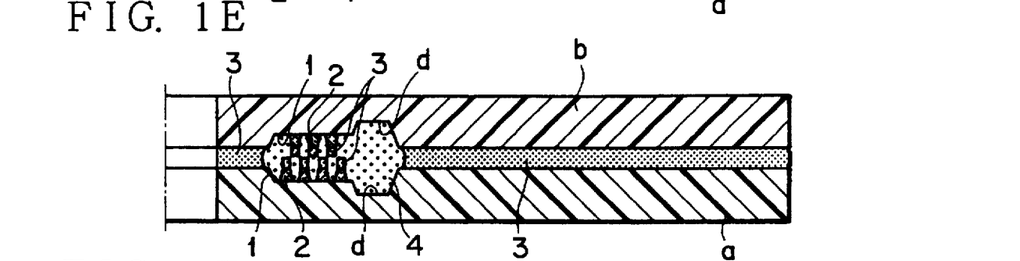
Figure 1F:
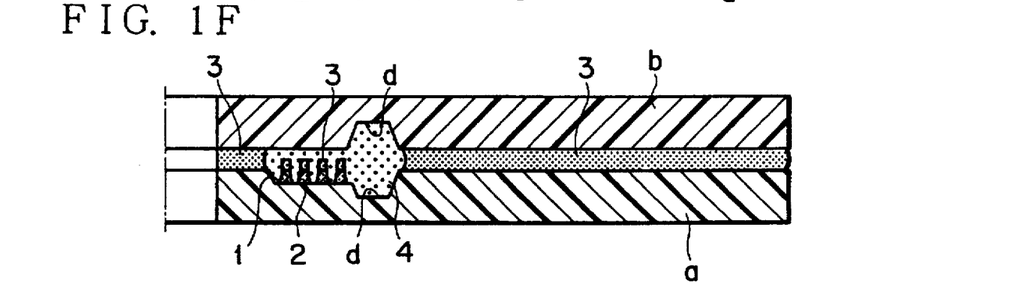

If the bonding, illustrated in FIG. 1E or 1F, is performed in a vacuum, no air will remain between the bonded surfaces. This prevents the strength of the stamper clamp groove d and the recess 1 from decreasing and makes the disk deformation unlikely. Furthermore, the conventional trouble is eliminated that the transparent part of the disk is clouded by trapped air bubbles.

When the liquid type reaction setting bonding agent 4 is an ultraviolet-setting bonding agent, ultraviolet light is irradiated into the stamper clamp groove d and the recess 1 at the same time that the pressing, illustrated in FIG. 1E or 1F, is carried out. When the liquid type reaction setting bonding agent 4 is a cationic polymerized, ultraviolet-setting bonding agent, the bonding agent is irradiated with ultraviolet radiation for a predetermined time after the application of the bonding agent as shown in FIG. 1D, is completed, to cause the cationic polymerized, ultraviolet-setting bonding agent to start hardening.

DETAILED DESCRIPTION OF PREFERRED EMBODIMENT

Preferred embodiments of this invention will now be described by referring to the accompanying drawings.

Figure 2:
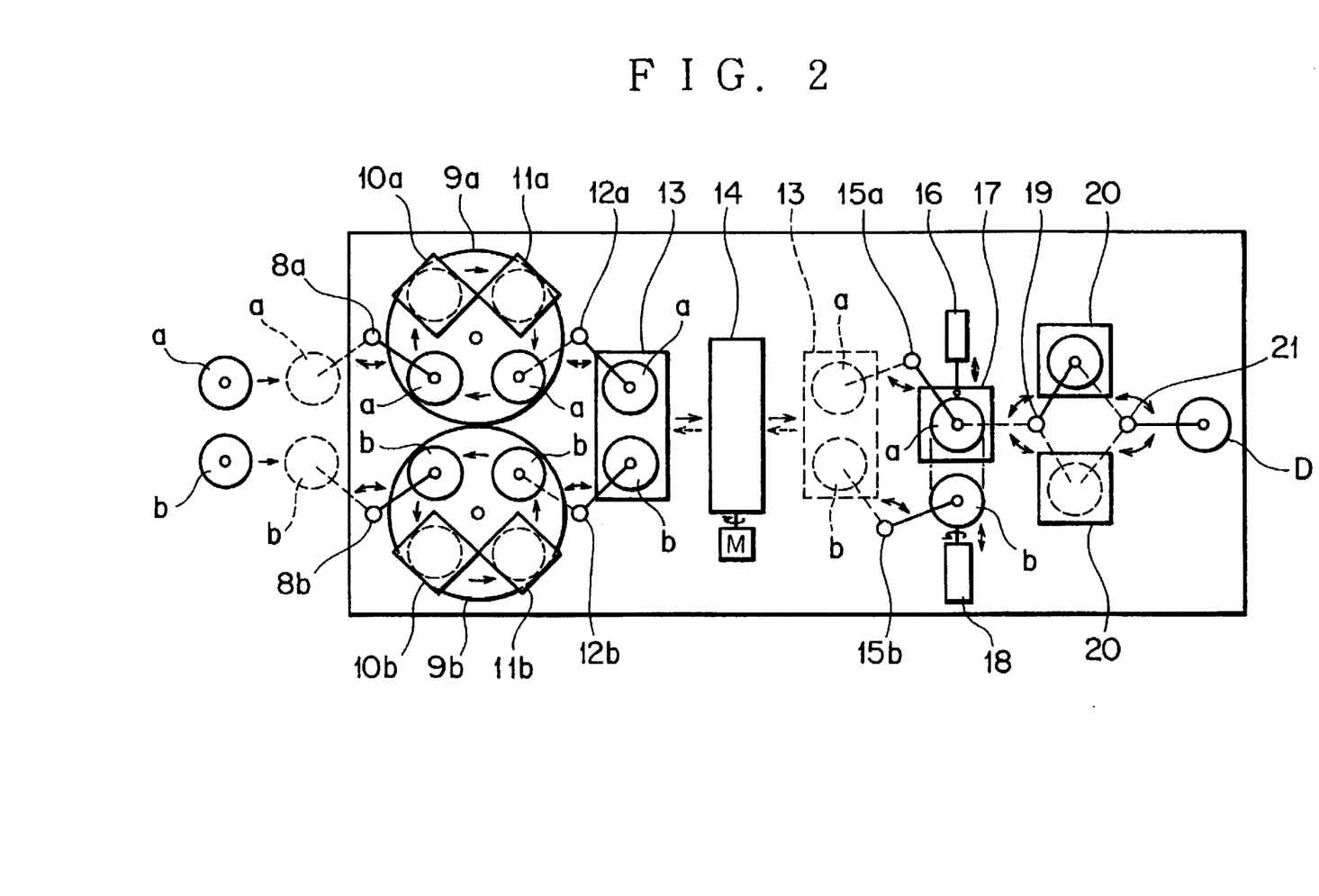
FIG. 2 is a schematic plan view showing the overall configuration of a first embodiment.

FIG. 2 is a schematic plan view showing the overall configuration of the first embodiment of the bonded disk manufacturing apparatus according to this invention.

This embodiment represents a case where an ultraviolet-setting bonding agent is used as a liquid type reaction setting bonding agent 4 to be applied to the stamper clamp groove d and the recess 1 for the title display in the one-sided disk a. The ultraviolet-setting bonding agent is of the type which is liquid at normal temperature and, when irradiated with ultraviolet light, hardens.

In FIG. 2, reference symbol a represents a one-sided disk for the A side before being bonded; b a one-sided disk for the B side before being bonded; and D a finished disk after the paired one-sided disks a, b are bonded together. The one-sided disks a, b has a cross section shown in FIG. 1A. In the following description, members having a or b in their reference symbols are those for the one-sided disk a or one-sided disk b. Designated 8a and 8b are disk supply arms; 9a, 9b index tables for printing a title; 10a, 10b screen printing portions; 11a, 11b ultraviolet irradiation portions; 12a, 12b disk transfer arms; 13 a hot melt coater table; 14 a roll coater for applying a hot melt; 15a, 15b disk transfer arms; 16 a liquid type bonding agent delivery portion for applying a liquid ultraviolet-setting bonding agent to the stamper clamp groove d and the recess 1 in the one-sided disk a; 17 a liquid bonding agent application table; 18 a disk turning device; 19 a disk transfer arm; 20 a bonding press portion; and 21 a disk takeup arm.

Two sets of the bonding press portions 20 are provided and operated alternately so as to be able to synchronize with the overall processing speed.

The one-sided disk a and the one-sided disk b are placed on a stand (not shown) and carried to the positions of the disk supply arms 8a, 8b. These one-sided disks a, b are transferred by the disk supply arms 8a, 8b onto the index tables 9a, 9b.

The index tables 9a, 9b are rotated one pitch at a time in a direction of arrow at predetermined intervals. The one-sided disks a, b mounted on the index tables 9a, 9b are transferred to the screen printing portions 10a, 10b, each of which screen-prints a title such as characters and patterns on the surface of the title display recess 1 of the one-sided disk by using an ultraviolet-setting ink, as shown in FIG. 1(B). Next, the one-sided disks a, b are irradiated with ultraviolet light at the ultraviolet irradiation portions 11a, 11b to harden the printed ink.

With the printed ink hardened, the one-sided disks a, b are transferred by the disk transfer arms 12a, 12b onto the coater table 13, on which they are passed under the roll coater 14 to apply the hot melt 3 to the bonding surfaces of the one-sided disks a, b, as shown in FIG. 1C.

Next, the one-sided disk a coated with the hot melt 3 is transferred onto the liquid bonding agent application table 17 by the disk transfer arm 15a. The other one-sided disk b coated with the hot melt 3 is transferred onto the disk turning device 18 by the disk transfer arm 15b.

When the one-sided disk a is mounted on the liquid type bonding agent application table 17, the liquid type bonding agent delivery portion 16 applies the liquid type ultraviolet-setting bonding agent 4 to the stamper clamp groove d and the title display recess 1 in the one-sided disk a, as shown in FIG. 1D. The disk turning device 18 turns the one-sided disk b transferred through 180x so that the surface to which the hot melt 3 was applied, faces down, and then stacks it on the one-sided disk a mounted on the liquid type bonding agent application table 17.

The one-sided disks a, b stacked on the liquid type bonding agent application table 17 are transferred by the disk transfer arm 19 onto one of the bonding press portions 20 where they are irradiated with ultraviolet light from a lamp while being pressed together, as described later, into a single bonded disk. Then, the finished disk D is taken out by the disk takeup arm 21 and carried onto the later process (e.g., inspection process).

Figure 3:
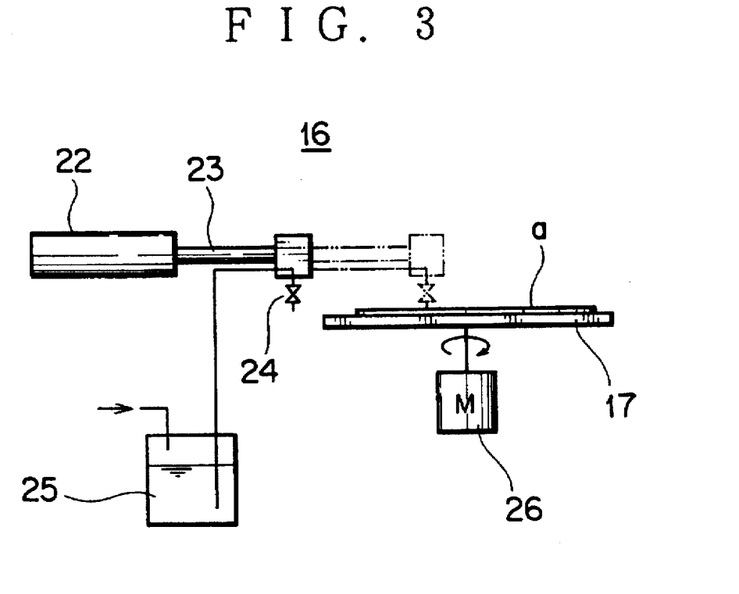
FIG. 3 is a schematic diagram showing the structure of a liquid bonding agent delivery portion and a liquid type bonding agent application table.

FIG. 3 shows the structure of the liquid bonding agent delivery portion 16 and the liquid bonding agent application table 17 of FIG. 2. In the figure, denoted 22 is a cylinder; 23 a cylinder rod driven by the cylinder 22; 24 a bonding agent delivery nozzle attached to the front end of the cylinder rod 23; 25 a bonding agent supply pressure tank for supplying the liquid type ultraviolet-setting bonding agent to the bonding agent delivery nozzle 24; and 26 a motor to rotate the liquid type bonding agent application table 17.

When the one-sided disk a coated with the hot melt 3 is transferred onto the liquid type bonding agent application table 17, the motor 26 is rotated. At the same time, the bonding agent delivery nozzle 24 is driven back and forth by the cylinder 22 to align with the position of the stamper clamp groove d and the title display recess 1 of the one-sided disk a, as illustrated by the dotted line.

At this position, the valve of the bonding agent delivery nozzle 24 is opened to apply the liquid type ultraviolet-setting bonding agent 4 in circle to the stamper clamp groove d and the recess 1 of the rotating one-sided disk a, as shown in FIG. 1D.

The amount of liquid type ultraviolet-setting bonding agent 4 is desirably set slightly more than the volume of the space formed by the stamper clamp groove d and the recess 1 when the two one-sided disks a, b are stacked together. This amount of bonding agent can fill the space completely without forming any gap between it and the hot melt 3 when the two one-sided disks a, b are bonded together, as shown in FIG. 1E, producing the maximum bonding effect.

Figure 4:
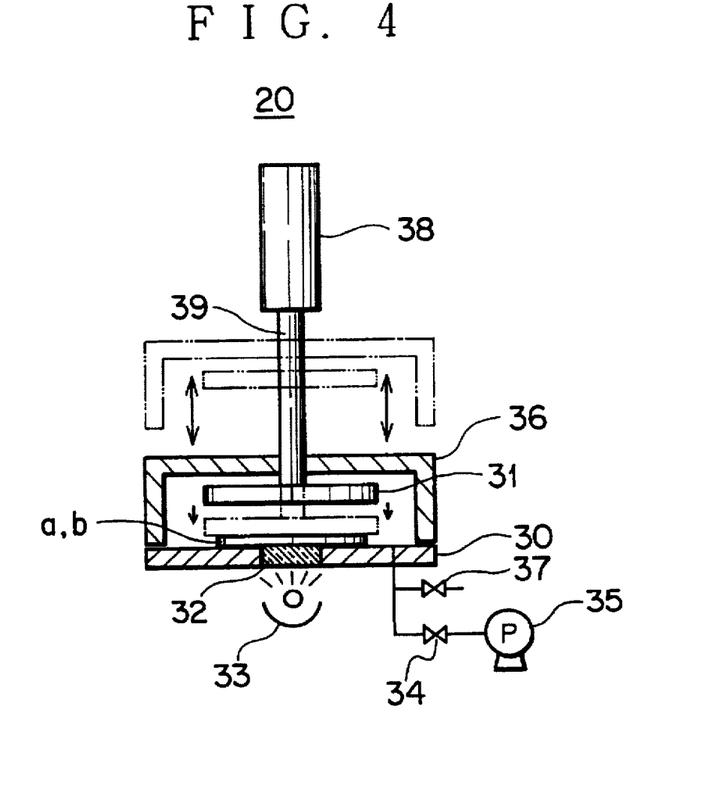
FIG. 4 is a schematic cross section showing the structure of a bonding press portion of the first embodiment.

FIG. 4 shows the construction of the bonding press portion 20 of FIG. 2. In the figure, designated 30 is a lower press plate and 31 an upper press plate. A disk of quartz glass 32, which is larger in diameter than the position of the stamper clamp groove d and recess 1 of the stacked one-sided disks a, b, is embedded in the lower press plate 30 at the center so that it is flush with the surface of the lower press plate 30. Through this quartz glass 32, the stamper clamp groove d and recess 1 of the one-sided disks a, b can be applied with ultraviolet radiation from the ultraviolet lamp 33 provided under the quartz glass 32. The lower press plate 30 is connected through a valve 34 to a vacuum pump 35 so that a vacuum chamber 36 is evacuated during the bonding press process. Denoted by 37 is a leak or vent valve the opens the vacuum tank 36 to the atmosphere.

The upper press plate 31, which is paired with the lower press plate 30, is vertically movable by a pressure cylinder 38. The vacuum tank 36 enclosing the entire upper press plate 31 is slidably mounted to a piston rod 39 of the pressure cylinder 38.

When a pair of the one-sided disks a, b are mounted in stack on the lower press plate 30, as shown, the pressure cylinder 38 lowers the upper press plate 31 and the vacuum tank 36. When the lower end of the vacuum tank 36 contacts the lower press plate 30, the vacuum tank 36 stops there on the lower press plate 30 hermetically sealing the interior by way of a packing not shown. The upper press plate 31 continues moving down until it is at a predetermined distance from the one-sided disks a, b mounted on the lower press plate 30, at which time the upper press plate 31 stops.

After the upper press plate 31 stops, the vacuum tank 36 is evacuated by the vacuum pump 35 so that air remaining between the stacked one-sided disks a, b is drawn out, leaving no air bubbles between the disks.

When the interior of the vacuum tank 36 reaches a vacuum level below a predetermined pressure, the pressure cylinder 38 is pressurized to further lower the upper press plate 31 pressing the stacked one-sided disks a, b against the lower press plate 30. At the same time that the pressing operation is performed, the stamper clamp groove d and recess 1 of the stacked one-sided disks a, b are irradiated by the ultraviolet lamp 33 to harden the liquid type ultraviolet-setting bonding agent 4 applied to the stamper clamp groove d and recess 1.

After a predetermined time, the leak (vent) valve 37 is opened to open the vacuum tank 36 to the atmosphere, the upper press plate 31 is lifted, and the ultraviolet irradiation from the ultraviolet lamp 33 is stopped. Now, the bonding of the paired one-sided disks a, b is completed.

The finished disk D bonded in this way has its space defined by the stamper clamp groove d and recess 1 filled with the ultraviolet-setting bonding agent 4, as shown in FIG. 1E. This construction greatly enhances the strength compared with the conventional disks.

Figure 5:
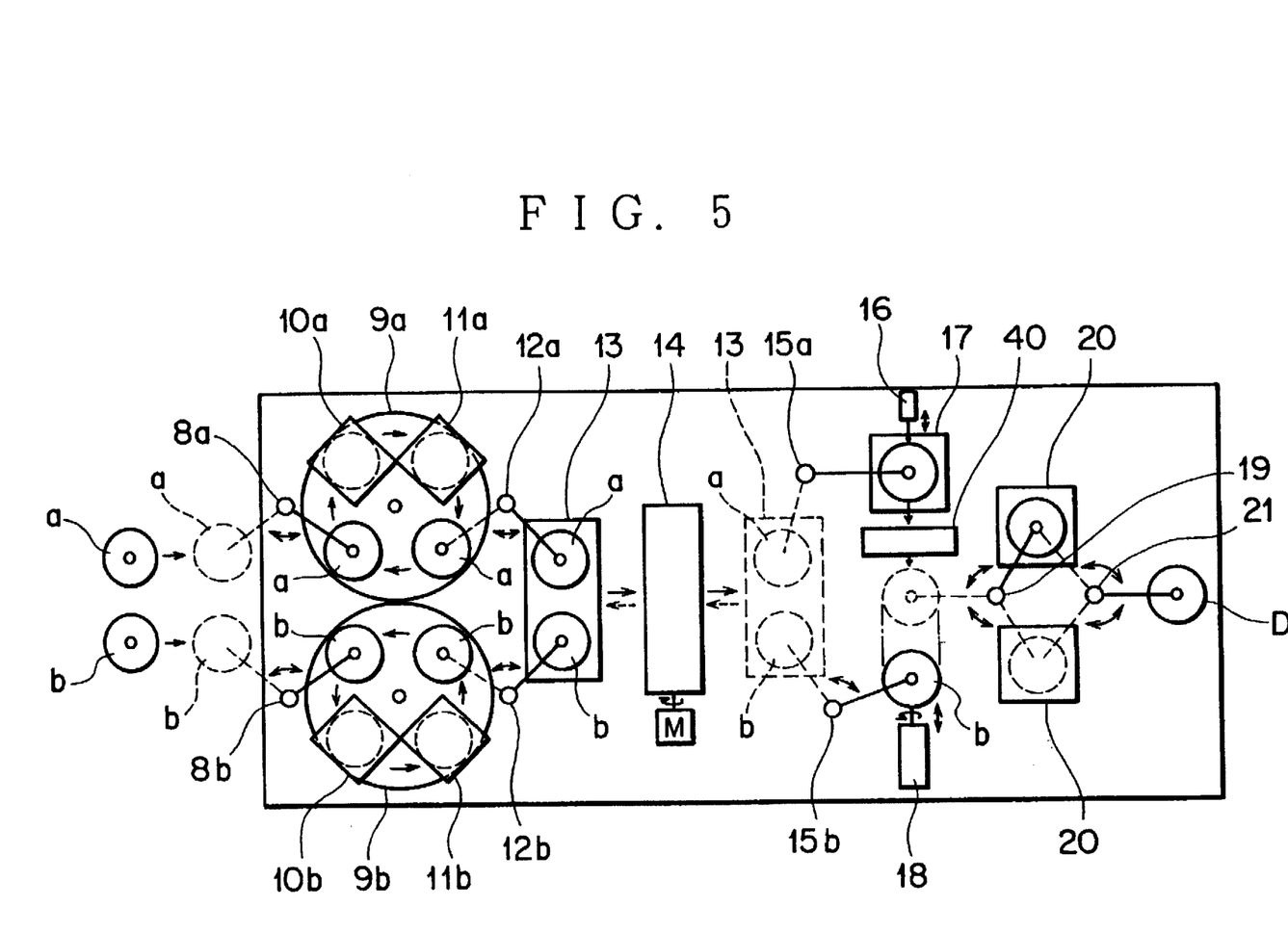
FIG. 5 is a schematic plan view showing the overall configuration of a second embodiment.

FIG. 5 shows a second embodiment of this invention.

The second embodiment represents a case where a cationic polymerized, ultraviolet-setting bonding agent is used as the liquid type ultraviolet-setting bonding agent 4 to be applied to the stamper clamp groove d and the title display recess 1 of the one-sided disk a. The cationic polymerized, ultraviolet-setting bonding agent is a bonding agent which is liquid at normal temperature and, when irradiated with ultraviolet light, produces cations that trigger a hardening reaction, resulting in the liquid type bonding agent being hardened in several seconds to several minutes. Therefore, when this cationic polymerized, ultraviolet-setting bonding agent is used, there is no need to irradiate ultraviolet light while at the same time pressing the stacked one-sided disks as does the first embodiment. What is needed is to irradiate ultraviolet light for a certain period of time after the cationic polymerized, ultraviolet-setting bonding agent was applied, to trigger the hardening reaction.

The points in which the second embodiment differs from the first embodiment are that an ultraviolet irradiator 40 to trigger the hardening reaction in the cationic polymerized, ultraviolet-setting bonding agent is installed near the liquid bonding agent delivery portion 16 and that the ultraviolet lamp 33 for the bonding press portion 20 (see FIG. 4) is obviated. The construction and operations of other members are identical with those of the first embodiment, so that identical members are given the same reference numerals and their explanations omitted.

In FIG. 5, when the one-sided disk a is transferred onto the liquid type bonding agent application table 17, the liquid type bonding agent delivery portion 16 applies the liquid type cationic polymerized, ultraviolet-setting bonding agent 4 to the stamper clamp groove d and the title display recess 1 of the one-sided disk a, as shown in FIG. 1D. After the cationic polymerized ultraviolet-setting bonding agent 4 is applied, the one-sided disk a is fed to the ultraviolet irradiator 40 where it is irradiated with ultraviolet light (radiation) for a predetermined time.

The application of ultraviolet generates cations that triggers a hardening reaction in the cationic polymerized ultraviolet-setting bonding agent 4, promoting the hardening of the bonding agent by the polymerization reaction without further requiring ultraviolet irradiation.

The disk turning device 18 turns the one-sided disk b through 180x to cause the surface applied with the hot melt 3 to face down and stack it on the one-sided disk a that was irradiated with ultraviolet light. The stacked one-sided disks a, b are transferred by the disk transfer arm 19 to one of the bonding press portions 20 where they are pressed together and bonded into a single disk, as shown in FIG. 1E. The completed disk D is then taken out by the disk takeup arm 21 and transferred to the later process (such as inspection process).

Figure 6:
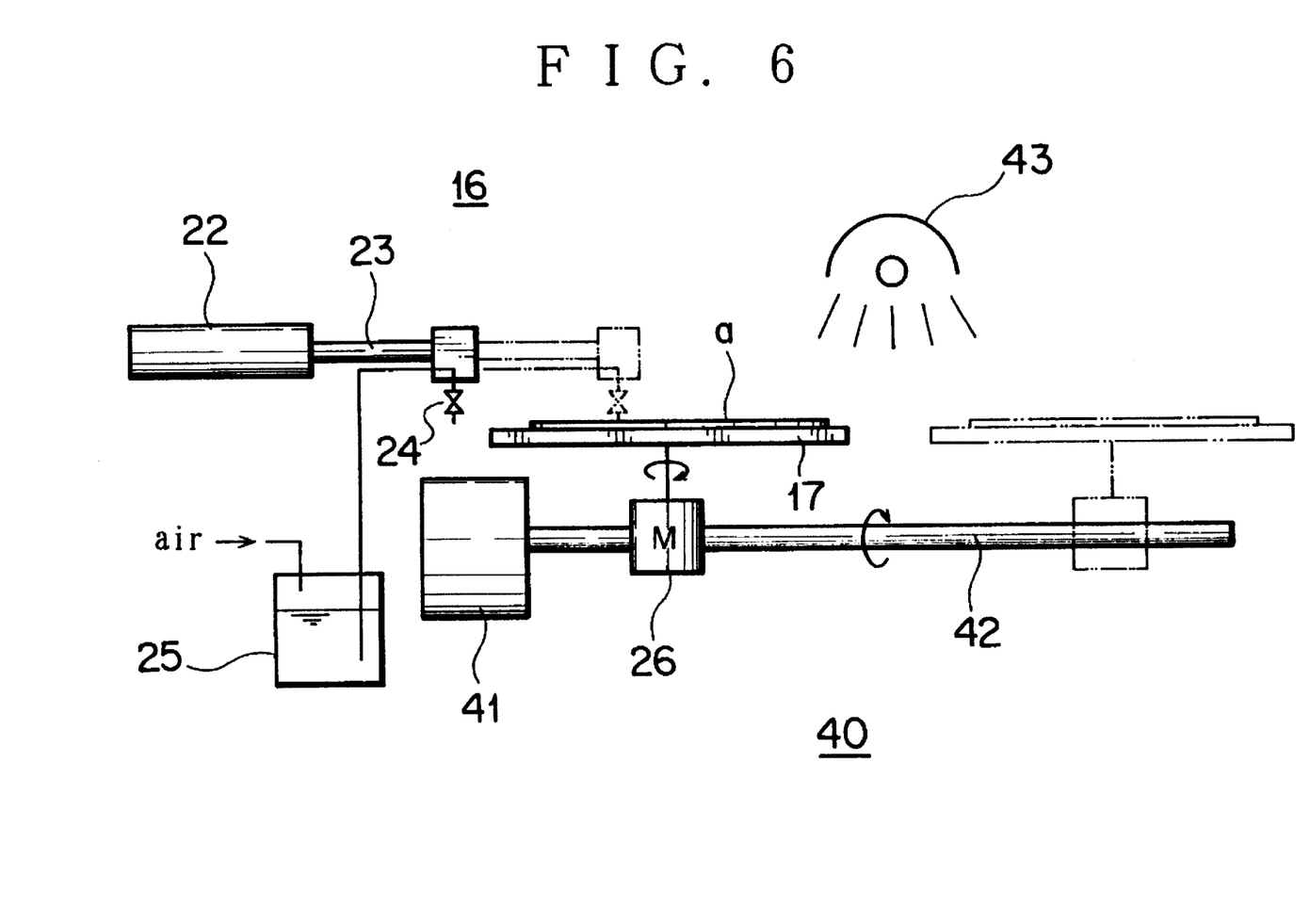
FIG. 6 is a schematic diagram showing the structure of a liquid bonding agent application device and an ultraviolet irradiation device in the second embodiment.

FIG. 6 shows the construction of the liquid bonding agent application device 16 and the ultraviolet irradiator 40 of FIG. 5. In the figure, denoted 22 is a cylinder; 23 a cylinder rod driven by the cylinder 22; 24 a bonding agent delivery nozzle attached to the front end of the cylinder rod 23; 25 a bonding agent supply pressure tank for supplying the liquid cationic polymerized, ultraviolet-setting bonding agent to the bonding agent delivery nozzle 24; 26 a motor for driving the liquid type bonding agent application table 17; 41 a feeding device for moving the liquid bonding agent application table 17; 42 a feed guide; and 43 an ultraviolet lamp. When the one-sided disk a applied with the hot melt is transferred onto the liquid type bonding agent application table 17, the motor 26 is started. At the same time, the bonding agent delivery nozzle 24 is driven back and forth by the cylinder 22 to align with the position of the stamper clamp groove d and the title display recess 1 of the one-sided disk a, as illustrated by the dotted line. In this position, the valve of the bonding agent delivery nozzle 24 is opened to apply the liquid type cationic polymerized, ultraviolet-setting bonding agent 4 in circle to the stamper clamp groove d and the title display recess 1 of the rotating one-sided disk a, as shown in FIG. 1D.

After the cationic polymerized, ultraviolet-setting bonding agent 4 is applied, the liquid type bonding agent application table 17 is moved under the ultraviolet lamp 43 to the position shown by a dotted line by the feeding device 41 and the feed guide 42. While the table 17 is moved, ultraviolet light is emitted from the ultraviolet lamp 43 initiating the hardening reaction in the cationic polymerized, ultraviolet-setting bonding agent 4.

In the preceding embodiments, the liquid type reaction hardening bonding agent uses an ultraviolet-setting bonding agent and a cationic polymerized, ultraviolet-setting bonding agent 4. In addition to these, other bonding agents, such as two-liquid type reaction-setting bonding agent may be used. The only requirement is that the bonding agent used does not soften even when subjected to heat once it has hardened.

Although in the above embodiments the title display recess 1 is formed in both the one-sided disks a, b, it may be formed only in the one-sided disk a, as shown in FIG. 1F.

In the preceding embodiments, the title is displayed by printing. The title display may be accomplished by sticking a seal printed with a title.

The DVDs were manufactured by the methods of the first and second embodiments under the following conditions. The DVDs fabricated were satisfactory.

Protective film
  "SK-5000" produced by Sony Chemical K.K.
  Film thickness: about 9 μm
Hot melt
  "Alon Melt PPET2009" produced by Toa Gosei K.K.
  Application temperature: 150° C.
  Amount applied: 75 mg/disc (=0.6 mg/cm$^2$)
Cationic polymerized, ultraviolet-setting bonding agent
  "Adeca Optomer KRX-726-1" produced by Asahi Denka Kogyo K.K.
  Amount applied: 40–45 mg/2-discs
  Amount of ultraviolet radiated: Conveyor speed at 5 m/min under a focused high voltage mercury lamp of 120 W/cm$^2$ Two-liquid type reaction-setting bonding agent "30Y-222" produced by Three Bond
Amount applied: 40–45 mg/2-discs While, in the preceding embodiments, the DVD has been taken as an example of a bonded disk, the present invention is not limited to the DVD but may be applied to any kind of disk as long as it is of a type in which at least two one-sided disks are bonded together into a single disk. When the title is displayed at the recess by printing, it is of course possible to use color inks in addition to black and white inks.

As described above, according to this invention, since the title is displayed on the bonding inner surface of the disk, the undulations of the surface of the clamper zone are prevented from causing any tilt in the disk. Hence, the clamper zone can be used as a reference surface during reproduction of recorded information while the tilt angle of the disk is reduced for improved reproduction.

Because the mating one-sided disks are bonded together with the space formed by the stamper clamp groove and the title display recess completely filled with the reaction setting bonding agent, the bonding agent filling the space in the completed disk will be not softened even when the disk is heated, preventing the strength of this portion of the disk from decreasing.

Hence, it is possible to minimize the deformation of the disk and to produce inexpensive bonded disks in large numbers. this results in little deformation even when they are stored or left at an atmosphere of high temperature for long period of time.

When the pair of one-sided disks are bonded in a vacuum, no air will remain between the bonding surfaces of the disks. This eliminates the conventional problems such that air bubbles remaining in the stamper clamp groove and the recess, on which the liquid type reaction setting bonding agent is applied, weaken the strength of the corresponding portion of the disk or that trapped air bubbles turn the transparent portion of the clamp zone of the disk into a turbid state.

What is claimed is:

1. A method of making a bonded disk comprising the steps of:

preparing a one-sided disk which has a recess for title display and a stamper clamp groove which merges with the recess, as one disk of paired one-sided disks to be bonded together;

applying a thermoplastic bonding agent to a bonding surface of at least one disk of the paired one-sided disks to be bonded together after displaying a title having desired characters and pattern a in the recess of the one-sided disk;

applying a liquid type reaction setting bonding agent to the stamper clamp groove and the recess of the one-sided disk;

stacking the paired one-sided disks so that their bonding surfaces, which are applied with the thermoplastic bonding agent and the reaction setting bonding agent, are in contact with each other; and pressing the paired one-sided disks together to form a bonded disk.

2. A method of making a bonded disk according to claim 1, wherein the pressing is performed in a vacuum.

3. A method of making a bonded disk according to claim 1, wherein the title display in the recess is formed by printing.

4. A method of making a bonded disk according to claim 1, wherein the title display in the recess is implemented by sticking a seal in the recess.

5. A method of making a bonded disk according to claim 1, wherein the liquid type reaction setting bonding agent is an ultraviolet-setting bonding agent, and the pressing is done while irradiating the ultraviolet-setting bonding agent with ultraviolet light.

6. A method of making a bonded disk according to claim 1, wherein the liquid type reaction setting bonding agent is a cationic polymerized, ultraviolet-setting bonding agent, and the pressing is done after irradiating the cationic polymerized, ultraviolet-setting bonding agent with ultraviolet light.

* * * * *